US009455446B2

(12) United States Patent
Lu et al.

(10) Patent No.: US 9,455,446 B2
(45) Date of Patent: Sep. 27, 2016

(54) SODIUM AND POTASSIUM ION BATTERIES WITH HALOGEN SALTS

(71) Applicant: Sharp Laboratories of America, Inc., Camas, WA (US)

(72) Inventors: Yuhao Lu, Camas, WA (US); Sean Vail, Vancouver, WA (US); Xin Zhao, Vancouver, WA (US); Jie Song, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/827,001

(22) Filed: Aug. 14, 2015

(65) Prior Publication Data

US 2015/0357646 A1    Dec. 10, 2015

Related U.S. Application Data

(63) Continuation-in-part of application No. 14/823,399, filed on Aug. 11, 2015, which is a continuation-in-part of application No. 14/795,834, filed on Jul. 9, 2015, which is a continuation-in-part of application No.

(Continued)

(51) Int. Cl.
*H01M 4/58* (2010.01)
*H01M 4/62* (2006.01)
(Continued)

(52) U.S. Cl.
CPC .................. *H01M 4/62* (2013.01); *C01C 3/12* (2013.01); *H01M 4/0404* (2013.01); *H01M 4/0452* (2013.01); *H01M 4/0471* (2013.01); *H01M 4/136* (2013.01); *H01M 4/1397* (2013.01); *H01M 4/58* (2013.01); *H01M 4/622* (2013.01); *H01M 4/625* (2013.01); *H01M 10/054* (2013.01); *H01M 10/052* (2013.01); *H01M 2004/027* (2013.01); *H01M 2004/028* (2013.01); *Y02E 60/122* (2013.01)

(58) Field of Classification Search
CPC .... H01M 4/58; H01M 10/054; H01M 4/625; H01M 10/052; H01M 2004/027
USPC .................................. 320/135; 429/199, 319
See application file for complete search history.

(56) References Cited

U.S. PATENT DOCUMENTS

2011/0127967 A1*   6/2011   Soloveichik ...... H01M 10/3918
                                                                    320/135

OTHER PUBLICATIONS

J.B. Goodenough, Y.Kim, Challenges for rechargeable Li Batteries, Chem. Mater. 22, (2010), 587-603.

*Primary Examiner* — Cynthia H Kelly
*Assistant Examiner* — Monique Wills
(74) *Attorney, Agent, or Firm* — Law Office of Gerald Maliszewski; Gerald Maliszewski

(57) ABSTRACT

A sodium or potassium battery is provided, prior to an initial charge and discharge cycle, with a halogen salt additive. As is conventional, the battery is made up of the following components: an anode, a cathode, and an electrolyte. In addition, the battery includes a halogen salt (MX), where M is a metal and X is a halogen element. The halogen salt is added to the anode, the cathode, the electrolyte, or combinations thereof. The concentration MX with respect to the component(s) to which it is added is in the range of 0.01% to 10% in weight. The element X can be selected from the group of halogen elements listed in the Periodic Table. M is a material such as lithium, sodium, potassium, cesium, magnesium, calcium, barium, titanium, manganese, iron, cobalt, nickel, copper, zinc, ammonium, or combinations thereof. Advantageously, the electrolyte may be either aqueous or non-aqueous.

4 Claims, 5 Drawing Sheets

Related U.S. Application Data

14/668,788, filed on Mar. 25, 2015, which is a continuation-in-part of application No. 14/472,228, filed on Aug. 28, 2014, which is a continuation-in-part of application No. 14/340,141, filed on Jul. 24, 2014, which is a continuation-in-part of application No. 14/320,352, filed on Jun. 30, 2014, which is a continuation-in-part of application No. 14/271,498, filed on May 7, 2014, which is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, which is a continuation-in-part of application No. 14/198,663, filed on Mar. 6, 2014, which is a continuation-in-part of application No. 14/193,782, filed on Feb. 28, 2014, which is a continuation-in-part of application No. 14/193,501, filed on Feb. 28, 2014, which is a continuation-in-part of application No. 14/174,171, filed on Feb. 6, 2014, which is a continuation-in-part of application No. 14/067,038, filed on Oct. 30, 2013, which is a continuation-in-part of application No. 14/059,599, filed on Oct. 22, 2013, now Pat. No. 9,083,041, which is a continuation-in-part of application No. 13/907,892, filed on Jun. 1, 2013, now Pat. No. 8,968,925, which is a continuation-in-part of application No. 13/897,492, filed on May 20, 2013, now Pat. No. 9,099,719, which is a continuation-in-part of application No. 13/872,673, filed on Apr. 29, 2013, now Pat. No. 9,246,164, which is a continuation-in-part of application No. 13/752,930, filed on Jan. 29, 2013, now Pat. No. 9,099,718, which is a continuation-in-part of application No. 13/603,322, filed on Sep. 4, 2012, now Pat. No. 9,159,502, and a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, now Pat. No. 9,269,953.

(51) Int. Cl.

| | | |
|---|---|---|
| *H01M 10/054* | (2010.01) | |
| *C01C 3/12* | (2006.01) | |
| *H01M 4/04* | (2006.01) | |
| *H01M 4/136* | (2010.01) | |
| *H01M 4/1397* | (2010.01) | |
| *H01M 10/052* | (2010.01) | |
| *H01M 4/02* | (2006.01) | |

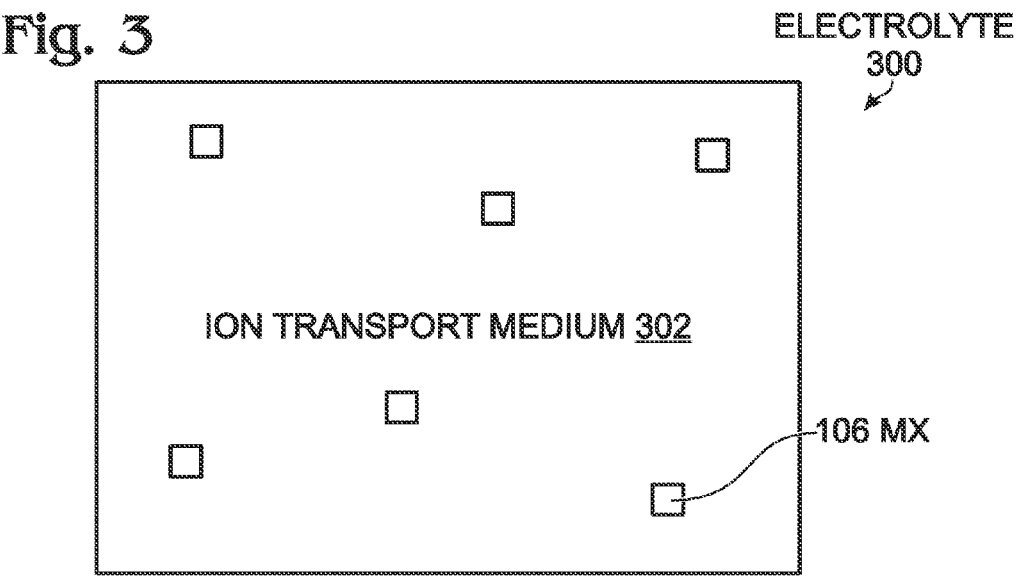
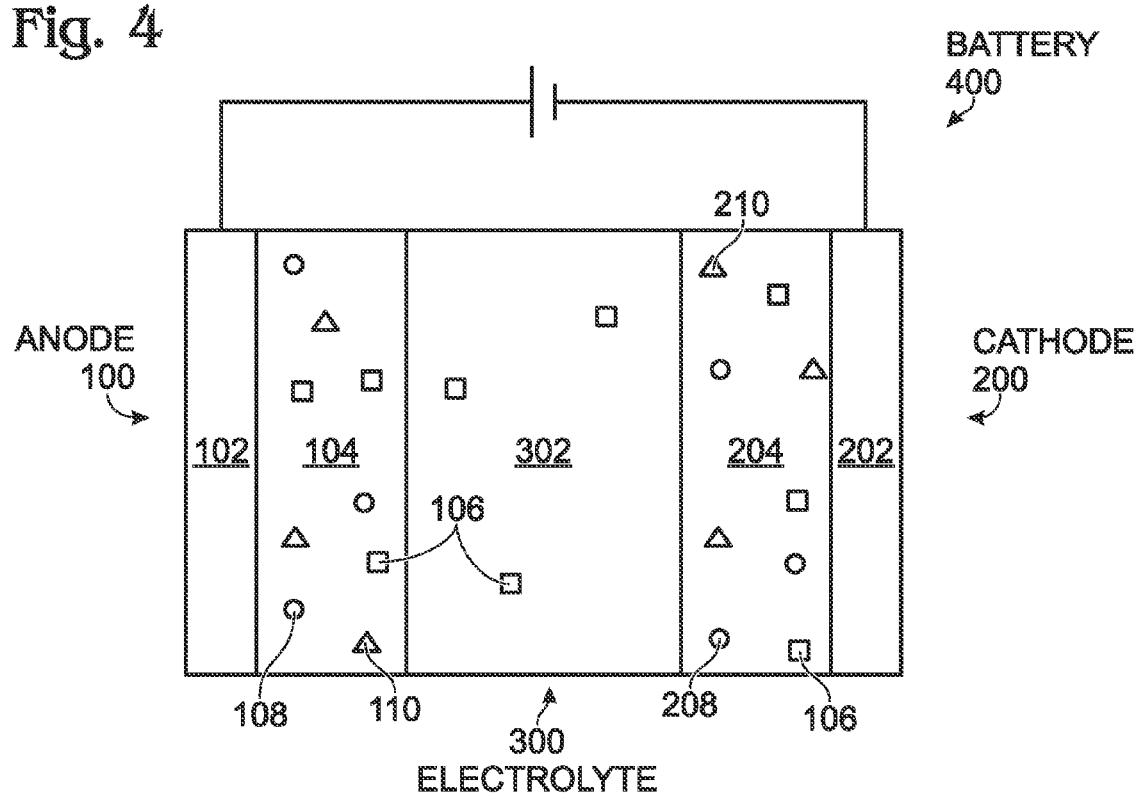

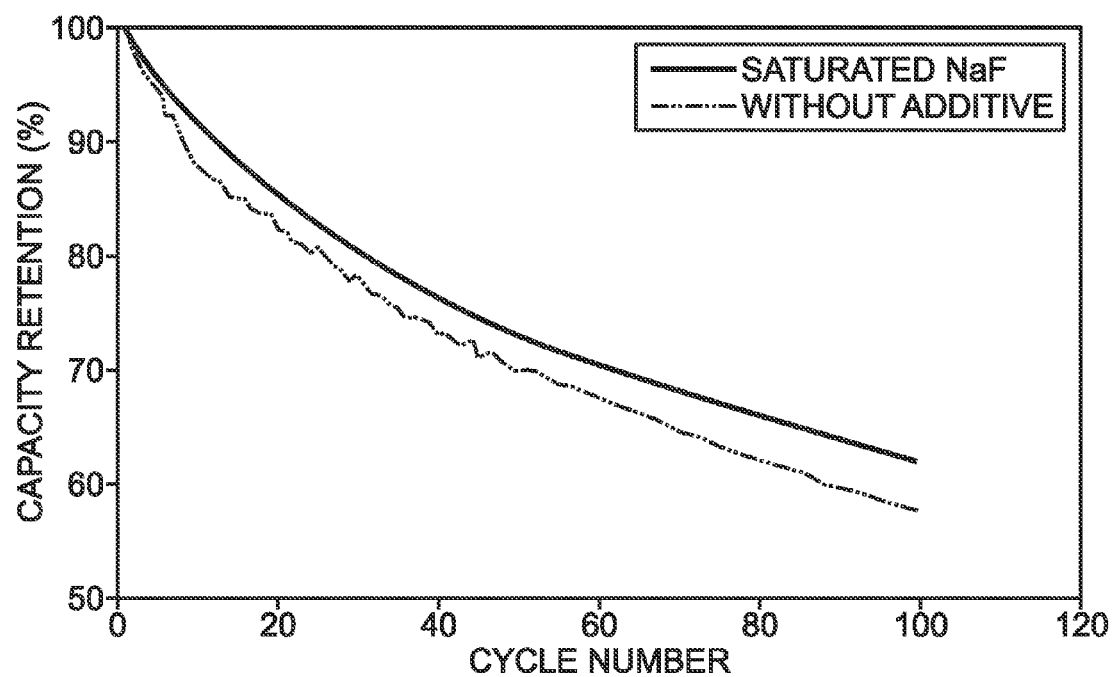

SODIUM AND POTASSIUM ION BATTERIES WITH HALOGEN SALTS

This invention was made with Government support under DE-AR0000297 awarded by DOE. The Government has certain rights in this invention.

RELATED APPLICATIONS

All applications listed in the Application Data Sheet associated with the instant application are incorporated herein by reference.

BACKGROUND OF THE INVENTION

1. Field of the Invention

This invention generally relates to electrochemical batteries and, more particularly, to a battery cathode, anode, or electrolyte that may include a halogen salt additive prior to an initial charge/discharge cycle.

2. Description of the Related Art

The demand continues for an economic means of storing the energy generated from renewable, but intermittent, solar and wind power. Energy transformational technology is expected to enable the large scale integration of renewable energy and to dramatically increase power generation and transmission efficiency. Rechargeable room-temperature batteries offer several advantages for these applications, including scale flexibility, economic maintenance, and energy-storage efficiency, as compared to other energy-storage technologies such as fly wheels, pumped water, compressed air, and high-temperature sodium/sulfur batteries. Although lithium-ion batteries have been successfully used, the demand for lithium drives concerns over its reserve and increasing cost, which renders large scale applications of lithium-ion batteries doubtful. Therefore, a low-cost rechargeable battery alternative to expensive lithium-ion batteries has been sought. Sodium-ion batteries (SIBs) are being considered as a lithium replacement candidate, because sodium has very similar properties to lithium, but at a cheaper cost.

In common with all batteries, electrolytes indispensably serve as the medium for ion transport between cathodes and anodes. Of course, the primary function of the electrolyte is to promote efficient $Na^+$-ions transport within a rechargeable SIB. Therefore, it is critical that the electrolyte be formulated to support high ionic conductivity. Liquid electrolytes consist of a dissociable sodium salt dissolved in a solvent, thus, forming highly mobile solvated $Na^+$-ions. In addition, to assure stability, the difference in energies between the lowest unoccupied molecular orbital (LUMO) and the highest occupied molecular orbital (HOMO) of the solvent should be larger than the difference between the anode chemical potential, $\mu_A$, and cathode chemical potential, $\mu_C$ [1]. Clearly, if $\mu_A$ is above the LUMO, the electrolyte will be reduced at the anode. Conversely, if $\mu_C$ is below the HOMO, the electrolyte will be oxidized at the cathode. Alternatively, even if these conditions are not strictly satisfied, stability can still be achieved if reactions occur at the electrode-electrolyte interface to produce a stable solid electrolyte interphase (SEI), which prevents further reactions.

In general, the chemical potentials of SIB anode materials are higher than the energy of LUMO of electrolytes. As a results, SEI layers form on the anodes to prevent the reaction between anode and electrolyte. The stability of the SEI layers determines whether the SEI layers dissolve into the electrolyte, especially at high temperatures. Without the protection of stable SEI layers, electrolytes continually decompose on the anode surface as sodium-ions are continuously consumed in the system, leading to rapid SIB capacity degradation.

It would be advantageous if a material could be added to a battery to promote stable SEI layers and better capacity retention, and to retard the dissolution of SEI layers in electrolyte.

It would be advantageous if this material could be added to the electrolyte, cathode, anode, or a combination of these battery components.

It would be advantageous if this material could be added to the electrolyte, cathode, anode, or a combination of these battery components, prior to initially charging and discharging the battery.

[1] J. B. Goodenough, Y. Kim, Challenges for rechargeable Li Batteries, Chem. Mater. 22, (2010), 587-603.

SUMMARY OF THE INVENTION

Disclosed herein is the use of halogen salts for the purpose of achieving stable solid electrolyte interphase (SEI) layers on the anode and cathode, and retarding their dissolution in the electrolyte. The halogen salts can be added in the electrolyte, anode, cathode, or combinations of these battery components. In addition, these halogen salts can also interact with cathode and anode materials to stabilize their performance. The use of halogen salts also promotes better capacity retention upon cycling. The halogen salts saturate the electrolyte and suppress the dissolution of SEI layers, especially at high temperatures.

Accordingly, a sodium or potassium battery is provided, prior to an initial charge and discharge cycle, with a halogen salt additive. As is conventional, the battery is made up of the following components: an anode, a cathode, and an electrolyte. In addition, the battery includes a halogen salt (MX), where M is a metal and X is a halogen element. The halogen salt is added to the anode, the cathode, the electrolyte, or combinations thereof. The concentration of MX with respect to the component(s) to which it is added is in the range of 0.01% to 10% in weight. The element X can be selected from the group of halogen elements listed in the Periodic Table. M is a material such as lithium, sodium, potassium, cesium, magnesium, calcium, barium, titanium, manganese, iron, cobalt, nickel, copper, zinc, ammonium, or combinations thereof.

The anode is primarily composed may be one of the following materials: sodium, potassium, hard carbon, phosphorus, soft carbon, metals, metal alloys, oxides, sulfides, nitrides, or combinations thereof. The cathode is primarily composed of a hexacyanometallates, oxides, sulfides, nitrides, or combinations thereof. Advantageously, the electrolyte may be either aqueous or non-aqueous.

Additional details of the above-described battery, as well as an anode, cathode, and electrolyte with a halogen salt additive are provided below.

BRIEF DESCRIPTION OF THE DRAWINGS

FIG. 3 is a partial cross-sectional view depicting an electrolyte, prior to assembly in a sodium or potassium battery.

FIG. 4 is a partial cross-sectional view of a sodium or potassium battery, prior to an initial charge and discharge cycle, with a halogen salt additive.

FIGS. 7A and 7B are graphs comparing the cycling performance of cells with and without NaF electrolyte additive at, respectively, room temperature and 50° C.

DETAILED DESCRIPTION

Figure 1:
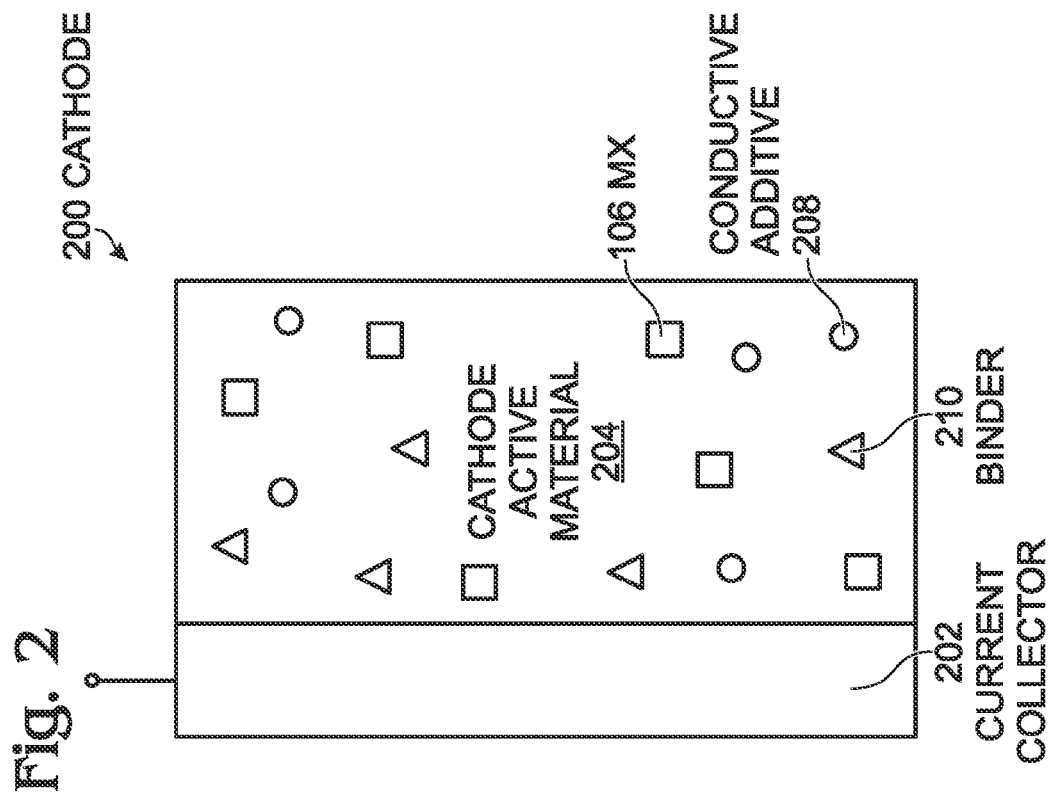
FIG. 1 is a partial cross-sectional view of an anode, prior to assembly in a sodium or potassium ion battery, with a halogen salt additive.

FIG. 1 is a partial cross-sectional view of an anode, prior to assembly in a sodium or potassium ion battery, with a halogen salt additive. The anode 100 comprises a current collector 102, and an anode active material 104 overlying the current collector capable of respectively hosting and releasing metal ions during charge and discharge cycling. The interaction between the anode active material 104 and metal ions can be chemical or physical in nature. The anode further comprises a halogen salt (MX) 106 added to the anode active material, where M is a metal and X is a halogen element. The anode active material 104 primarily comprises one or more of the following: sodium, potassium, hard carbon, phosphorus, soft carbon, metal, metal alloys, oxides, sulfides, nitrides, and combinations thereof. These metals, metal alloys, oxides, sulfides, or nitrides may include potassium or sodium. As is conventional, the anode 100 may include conductive additives 108, such as carbon black, carbon nanotubes (CNTs), graphite, or carbon nanofibers (CNFs). As used herein, "primarily" means more than 50% by weight. The anode 100 may also include a binder 110 such as poly(vinylidene fluoride) (PVDF), copolymers of PVDF e.g. poly(vinylidene fluoride-co-hexa fluoropropylene) (PVDF-HFP), PVC, PVA, polyethylene (PE), polypropylene (PP), ethylene vinyl acetate, and celluloses, e.g. methyl cellulose, carboxymethyl cellulose, ethyl cellulose, butyl cellulose, cellulose acetate, and cellulose nitrate.

The M material in the MX 106 may be lithium, sodium, potassium, cesium, magnesium, calcium, barium, titanium, manganese, iron, cobalt, nickel, copper, zinc, ammonium, or combinations thereof. The X material is selected from the group of halogen elements listed in the Periodic Table. The MX concentration with respect to anode active material 104 is in the range of 0.01% to 10% in weight.

Figure 2:
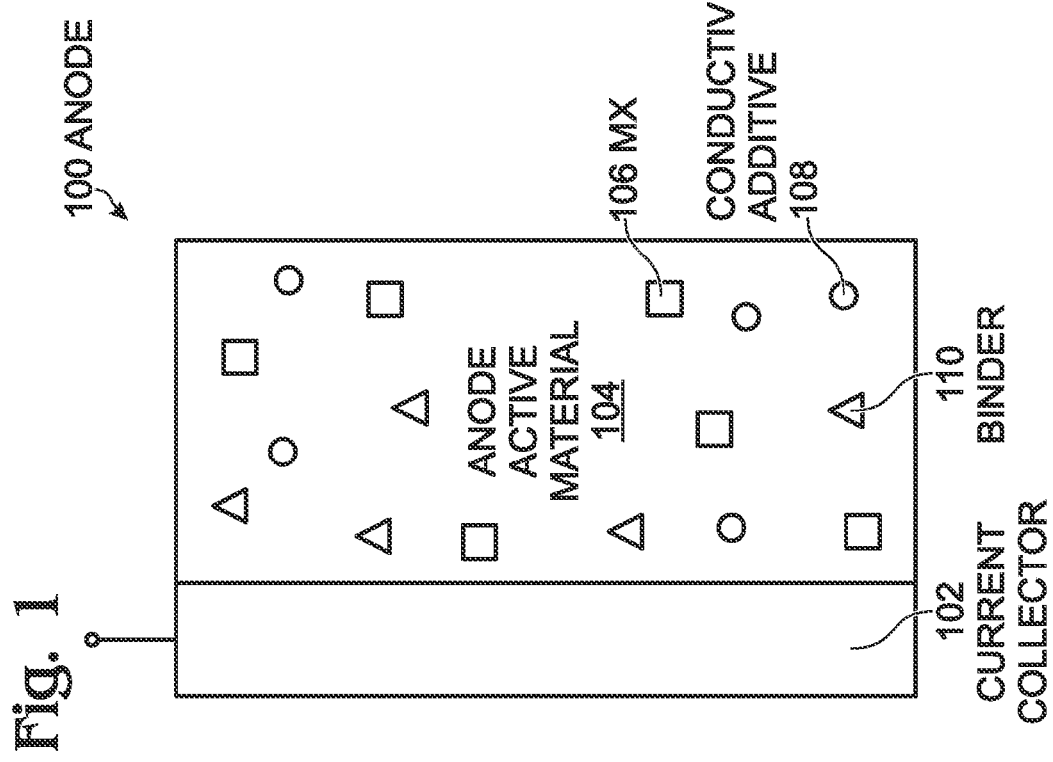
FIG. 2 is a partial cross-sectional view of a cathode, prior to assembly in a sodium or potassium ion battery, with a halogen salt additive.

FIG. 2 is a partial cross-sectional view of a cathode, prior to assembly in an electrochemical sodium or potassium ion battery, with a halogen salt additive. The cathode 200 comprises a current collector 202, and a cathode active material 204 capable of respectively releasing and hosting metal ions during charge and discharge cycling. The interaction between the cathode active material 204 and metal ions can be chemical or physical in nature. The cathode further comprises a halogen salt additive (MX) 106 added to the cathode active material, where M is a metal and X is a halogen element. As is conventional, the cathode 200 may also include conductive additives 208, such as carbon black, CNTs, graphite, or CNFs. The cathode 200 may also include a binder 210 such as PVDF, copolymers of PVDF e.g. PVDF-HFP, PVC, PVA, PE, PP, ethylene vinyl acetate, and celluloses, e.g. methyl cellulose, carboxymethyl cellulose, ethyl cellulose, butyl cellulose, cellulose acetate, and cellulose nitrate.

The cathode active material 204 primarily comprises a material such as hexacyanometallates, oxides, sulfides, nitrides, or combinations thereof. These oxides, sulfides, or nitrides may include potassium or sodium. The hexacyanometallate is defined herein as having the chemical formula $A_xM1_mM2_n(CN)_z \cdot d[H_2O]_{ZEO} \cdot e[H_2O]_{BND}$, where A is a sodium (Na), potassium (K), or a combination of Na and K;

where M1 is a metal selected from a group consisting of 2+ and 3+ valance positions;

where M2 is a metal selected from a group consisting of 2+ and 3+ valance positions;

where $[H_2O]_{ZEO}$ represents zeolite water molecules;

where $[H_2O]_{BND}$ represents hound water molecules;

where x is in the range of 0.5 to 2;

where M is in the range of 0.5 to 1.5;

where N is in the range of 0.5 to 1.5;

where z is in the range of 5 to 6;

where d is 0 to 14;

where e is in the range of greater than 0 and less than 8.

Alternatively, the formula may be written as $A:M1:M2:(CN):[H_2O]_{ZEO}:[H_2O]_{BND}=x:m:n:z:d:e$.

The M material in the MX 106 may be lithium, sodium, potassium, cesium, magnesium, calcium, barium, titanium, manganese, iron, cobalt, nickel, copper, zinc, ammonium, or combinations thereof. The X material is selected from the group of halogen elements listed in the Periodic Table. The MX 106 concentration with respect to cathode active anode material 204 is in the range of 0.01% to 10% in weight.

FIG. 3 is a partial cross-sectional view depicting an electrolyte, prior to assembly in a sodium or potassium battery. The electrolyte 300 comprises an ion transport medium 302 and a halogen salt additive (MX), where M is a metal and X is a halogen element. The M material in the MX 106 may be lithium, sodium, potassium, cesium, magnesium, calcium, barium, titanium, manganese, iron, cobalt, nickel, copper, zinc, ammonium, or combinations thereof. The X material is selected from the group of halogen elements listed in the Periodic Table. The MX 106 concentration with respect to solvent 302 is in the range of 0.01% to 10% in weight.

Some examples of liquid or gel ion transport mediums 302 include one or a few types of carbonates, e.g., ethylene carbonate (EC), propylene carbonate (PC), dimethyl carbonate (DMC) and diethyl carbonate (DEC) etc. Alternatively, the ion transport medium 302 can be a solid film that also acts as a separator (ion-permeable barrier). It may comprise a polymer host, e.g., PVDF, PVDF-HFP, PEO, PAN, and PMMA or an ionic liquid e.g. $PYR_{14}FSI$, [BMIM]Cl and [EMIM]Cl, and may further include an optional plasticizer e.g. inorganic nanoparticles ($SiO_2$, $Al_2O_3$ and MgO etc.), and EC and PC to strengthen the ionic conductivity.

FIG. 4 is a partial cross-sectional view of a sodium or potassium battery, prior to an initial charge and discharge cycle, with a halogen salt additive. The battery 400 comprises an anode 100, a cathode 200, and an electrolyte 300. The battery 400 also comprises a halogen salt (MX) 106, where M is a metal and X is a halogen element. The sodium or potassium ions cycled between the cathode 200 and anode 100 may be loaded into the cathode, the anode, or both the anode and cathode prior to the initial charge/discharge cycle. As noted above, the halogen salt is added to a battery component including the anode 100, the cathode 200, and the electrolyte 300. The halogen salt 106 is shown in all three of the battery components, but that is not necessary, as the halogen salt can be added to just one of the battery components or a combination of two components. Also not shown is an ion-permeable separator, which may be used in some aspects of the battery, such as when the electrolyte 300 is a liquid. The MX 106 concentration with respect to the component or combination of components to which it is added is in the range of 0.01% to 10% in weight. Details of the cathode 200, anode 100, and electrolyte 300 have been provided above, and are not repeated here in the interest of brevity.

Advantageously, the electrolyte 300 may be a non-aqueous electrolyte, but it may also be aqueous. In general, when using an organic electrolyte, irreversible capacity is consumed on the first discharge cycle to form an solid electrolyte interphase (SEI) layer on the anode, which prevents the electrolyte from decomposing further. The stable SEI layer directly contributes to the good cycling performance of batteries. Without exception, an SEI layer forms on the anode of a sodium-ion battery (SIB). However, it is speculated that SEI layers on SIB anodes are not stable, and have a tendency to dissolve into electrolytes. Although the dissolution may not be significant at room temperature, it is accelerated at high temperatures, e.g., greater than 50° C. SEI dissolution gives rise to some stability issues in SIBs. Without the protection of SEI layers, electrolytes keep reacting with the anodes while the sodium-ions are consumed, which leads to rapid degradation of battery performance.

To improve the stability of SEI layers, halogen salts are added to sodium-ion batteries (or potassium-ion batteries) so as to saturate the electrolyte and reduce the SEI dissolution. Simultaneously, the halogen salts can cover the anode so as to form an artificial SEI layer to prevent the direct contact between electrolyte and anode, promoting stable performance. Moreover, halogen salts can interact with the cathodes to improve their stability as well. In fact, halogen salts can be added into cathode, anode, or electrolyte. Their concentrations can range as high as 10 wt. %.

Example 1

NaCl Residing in Prussian White During Synthesis

A Prussian White (PW) cathode is used as an example, but the SIBs or potassium-ion batteries described herein are not limited to use Prussian White cathodes. During the Prussian White synthesis, a large amount of NaCl is used as support salts to increase the $Na^+$-ion concentration in the reaction solution so as to obtain the high $Na^+$-contained Prussian White materials. In this example, the NaCl was intentionally not cleaned from the PW to evaluate the impact of NaCl on the cycling performance of a PW cathode.

The formula of the PW cathode in this example is $Na_xMn_yFe(CN)_6$ (excluding water content). Its composition of as-synthesized PW was acquired by inductively coupled plasma elemental analysis (ICP). As a comparison, a sample of the as-synthesized PW was washed thoroughly to remove NaCl. The compositions of the two PW samples are listed in Table 1. The high content of $Na^+$-ions in the as-synthesized PW indicates a residue of NaCl. After washing, the concentration of $Na^+$-ions was reduced because NaCl was washed out of the PW materials.

TABLE 1

| ICP results for PW | | | |
|---|---|---|---|
| | Na | Mn | Fe |
| As synthesized | 2.12 | 0.86 | 1 |
| Washed | 1.77 | 0.72 | 1 |

With respect to the electrochemical evaluation of the PW cathode, cells were assembled with a PW cathode and a sodium metal anode, separated by Celgard separator. The PW cathode consisted of 86% PW, 7% carbon black, and 7% polyvinylindene fluoride binder. In these cells, an electrolyte of 1M $NaPF_6$ in EC/DEC was used. All cells were charged at 0.1 C and discharged at 1 C.

Figure 5A:
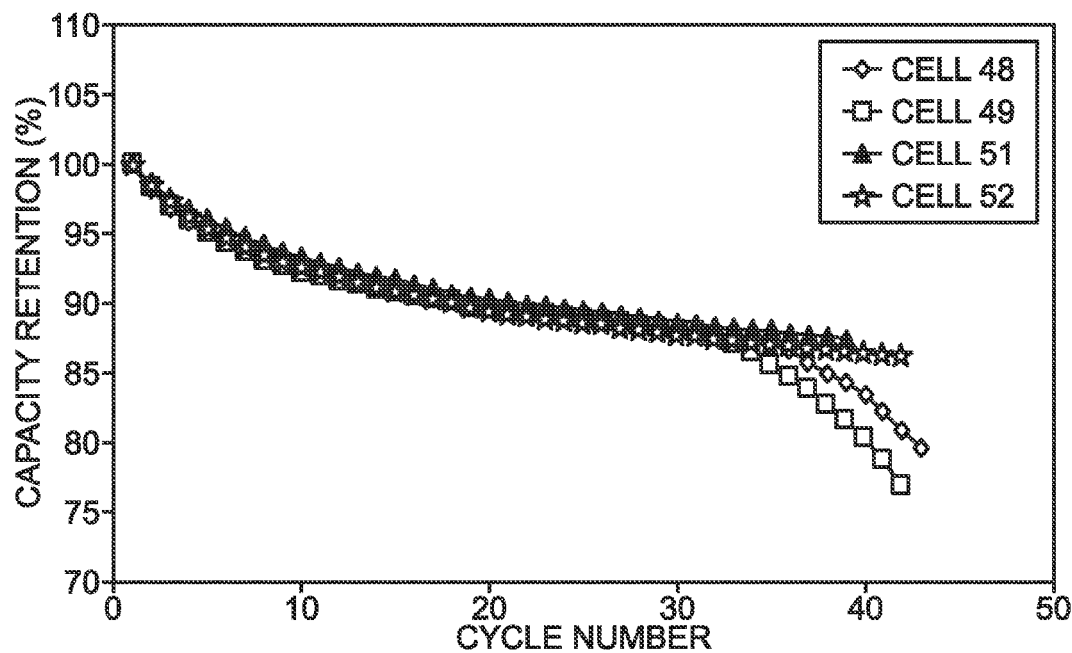
FIGS. 5A and 5B are graphs depicting the normalized capacity retention and coulombic efficiencies upon cycling of cells with PW electrodes, respectively with and without additional washing.
Figure 5B:
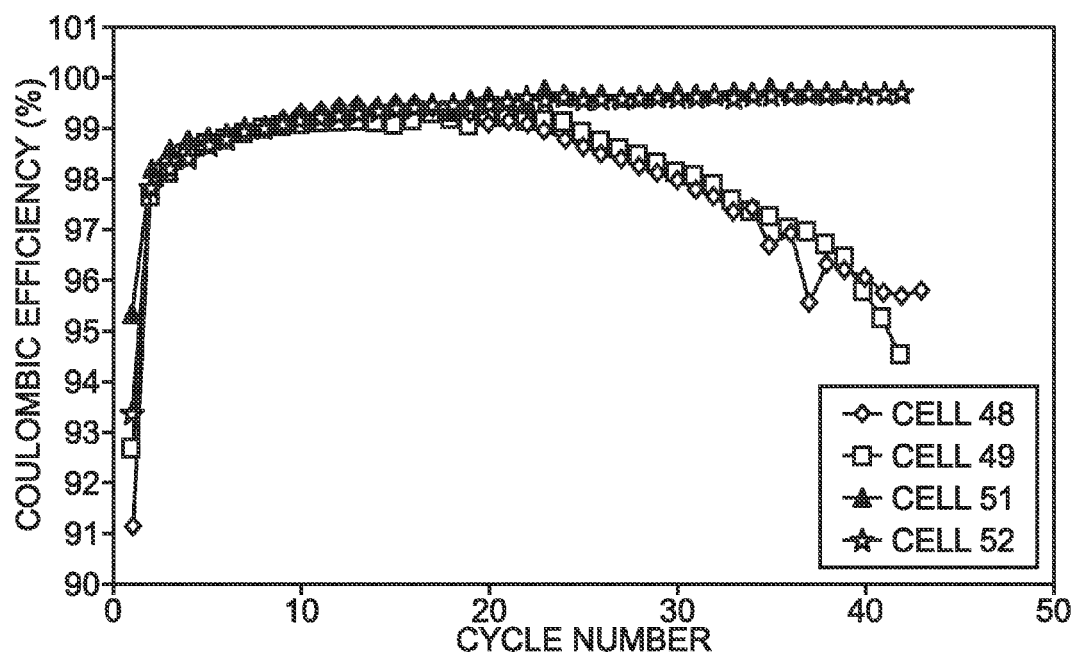

FIGS. 5A and 5B are graphs depicting the normalized capacity retention and coulombic efficiencies upon cycling of cells with PW electrodes, respectively with and without additional washing. Half cells 48 are 49 washed, and half-cells 51 and 52 are as-synthesized (unwashed). At the beginning of cycling, all cells showed similar behavior with respect to capacity degradation. However, the washed PW electrodes showed a faster degradation than the as-synthesized PW electrodes after the 30th cycle. The difference between these two PW electrodes can be observed in their coulombic efficiencies as well. In the first cycle. Cells 48 and 49 had lower coulomb efficiencies than Cells 51 and 52. Compared with the washed PW electrodes, the as-synthesized PW electrodes with residual NaCl showed a continuously ascendant coulombic efficiency with cycling, which implies that NaCl interacts with the PW surface to stabilize its structure. Simultaneously, NaCl diffuses to anode through the electrolyte to interact with sodium metal surface, which helps the formation of stable SEI layers. NaCl saturated the electrolyte upon cycling so that the dissolution of the SEI layer was suppressed and the cells demonstrated better cycling performance.

Example 2

NaCl Added to Prussian White Electrode

Aside from the NaCl resided in the as-synthesized PW cathode, a certain amount of NaCl was added into the pure PW material to make the electrode. The pure $Na_xMn_yFe(CN)_6$, PW131, was synthesized and NaCl was deliberately cleaned from the sample. According to ICP data, the composition of the PW material was Na:Mn:Fe=1.93:1.08:1. To check the impact of NaCl on sodium-ion battery performance, 3% NaCl was added to PW131 (NaCl-PW131). Mixed with the PVdF and carbon black, PW131 and NaCl-PW131 were made into PW cathodes. Using the same cell configuration and electrolyte as mentioned in Example 1, cells were assembled with these the two kinds of PW cathodes and a sodium metal anode.

Figure 6:
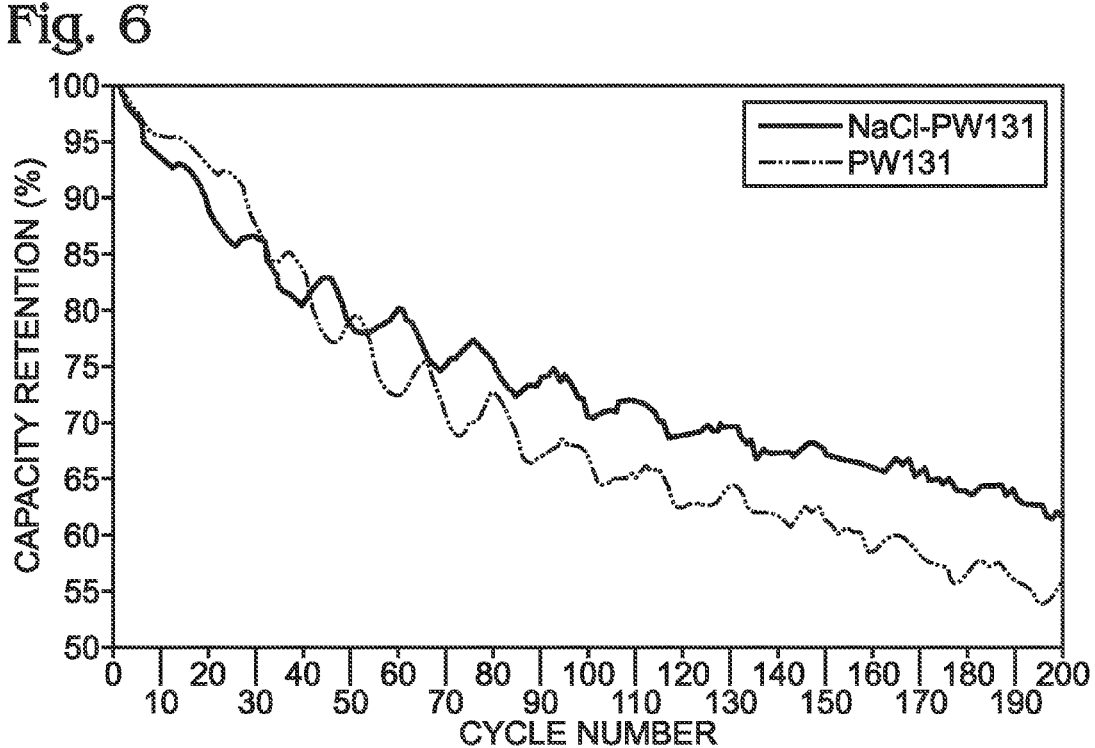
FIG. 6 is a graph comparing the % capacity retention of cells with PW131 and NaCl-PW131 cathodes over 200 cycles with a charge/discharge current of 1 C (1 C=150 milliamp hours per gram (mA/g)).

FIG. 6 is a graph comparing the % capacity retention of cells with PW131 and NaCl-PW131 cathodes over 200 cycles with a charge/discharge current of 1 C (1 C=150 milliamp hours per gram (mA/g)). In 200 cycles, the capacity retention of PW131 was 55.7%, but that of NaCl-PW131 was 61.8%. As in Example 1, NaCl improved the cell cycling performance.

Example 3

NaF Added in the Electrolyte

Halogen salts can be added into the electrolyte. In this experiment, sodium fluoride (NaF) saturated an electrolyte of 1M NaPF$_6$ in EC/DEC, and then the electrolyte was used to assemble sodium-ion batteries that consisted of PW cathodes and hard carbon anodes. The cathodes were made up of 86% PW material, 7% carbon black, and 7% PVdF binder. The anodes consisted of 95% hard carbon and 5% PVdf binder. As a comparison, an electrolyte of 1M NaPF$_6$ in EC/DEC without NaF was used.

Figure 7A:
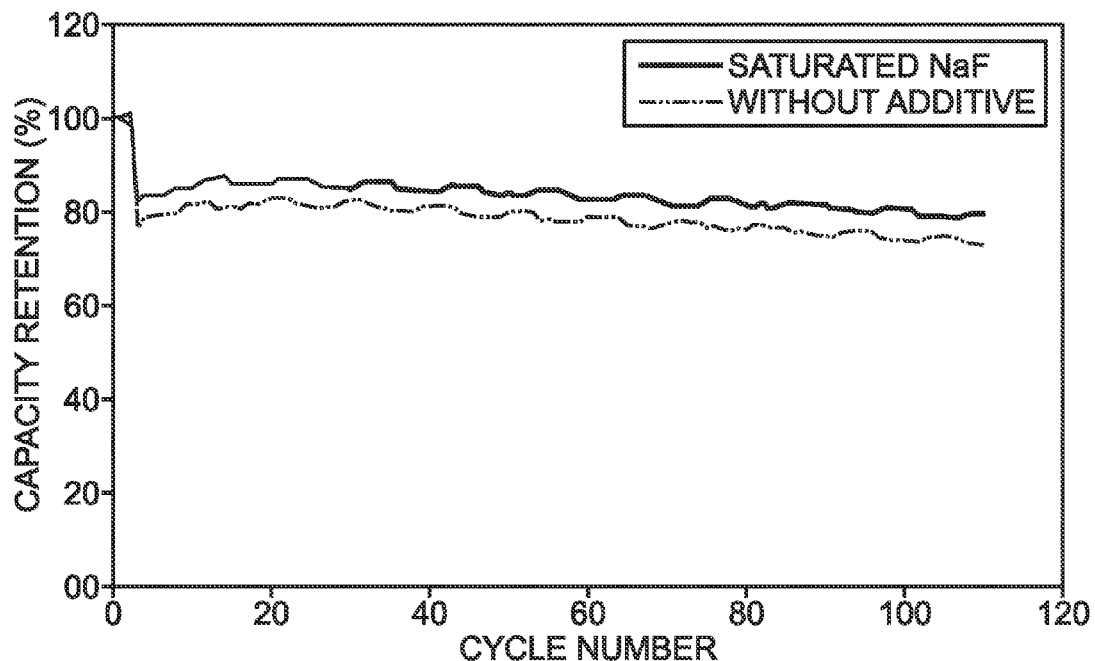

FIGS. 7A and 7B are graphs comparing the cycling performance of cells with and without NaF electrolyte additive at, respectively, room temperature and 50° C. Initially, all the batteries were cycled twice at 0.1 C, and then charge currents of 0.5 C and discharge currents of 1 C were used. At room temperature, the batteries showed a similar cycling performance, but NaF increased the reversible capacity in the PW/HC sodium-ion batteries at 1 C (FIG. 7A). At 50° C., batteries with the NaF additive showed a slower capacity degradation than those without NaF upon cycling (FIG. 7B). From these results it can be concluded that the additive of NaF certainly improved the performance of PW/HC sodium-ion batteries.

Example 4

KF Added in the Electrolyte

The NaF in Example 3 was replaced with KF, which was dissolved into an electrolyte of 1M NaPF$_6$ in EC/DEC. In order to evaluate the additive, sodium-ion batteries were assembled with PW cathodes and hard carbon anodes, separated by Celgard separators. Compared to the cells with the standard electrolyte (without the KF additive), the batteries with KF additive showed a better reversible behavior, although there is only a small improvement in their coulombic efficiencies at the first cycle from 4% to 76%.

A halogen salt has been provided as an additive to one or more battery components during fabrication, prior to an initial charging and discharging cycle. Examples of particular materials and process details have been presented to illustrate the invention. However, the invention is not limited to merely these examples. Although sodium-ions were presented in many of the examples, it should be understood that the invention is applicable to other alkali and alkaline earth metal Prussian Blue analogue cathode materials. Other variations and embodiments of the invention will occur to those skilled in the art.

We claim:

1. A cathode with a halogen salt additive comprising:
   a current collector;
   a cathode active material capable of respectively releasing and hosting metal ions during charge and discharge cycling; and,
   a halogen salt additive (MX) added to the cathode active material, where M is a metal and X is a halogen element.

2. The cathode of claim 1 wherein the cathode active material primarily comprises a material selected from a group consisting of hexacyanometallate, oxides, sulfides, nitrides, and combinations thereof.

3. The cathode of claim 1 wherein M is a material selected from a group consisting of lithium, sodium, potassium, cesium, magnesium, calcium, barium, titanium, manganese, iron, cobalt, nickel, copper, zinc, ammonium, and combinations thereof.

4. The cathode of claim 1 wherein the MX concentration with respect to active cathode material is in a range of 0.01% to 10% in weight.

* * * * *